(12) United States Patent
Meyer et al.

(10) Patent No.: US 10,339,727 B2
(45) Date of Patent: Jul. 2, 2019

(54) WIRELESS COMMUNICATION DEVICES

(71) Applicant: TomTom Telematics B.V., Amsterdam (NL)

(72) Inventors: Ulf Meyer, Leipzig (DE); Torsten Schlieder, Leipzig (DE); Oliver Gründler, Leipzig (DE); Alexander Schmidt, Halle (DE)

(73) Assignee: TOMTOM TELEMATICS B.V., Amsterdam (NL)

( * ) Notice: Subject to any disclaimer, the term of this patent is extended or adjusted under 35 U.S.C. 154(b) by 278 days.

(21) Appl. No.: 14/894,580

(22) PCT Filed: May 30, 2014

(86) PCT No.: PCT/EP2014/061276
§ 371 (c)(1),
(2) Date: Nov. 30, 2015

(87) PCT Pub. No.: WO2014/191558
PCT Pub. Date: Dec. 4, 2014

(65) Prior Publication Data
US 2016/0125669 A1    May 5, 2016

Related U.S. Application Data

(63) Continuation of application No. PCT/EP2014/061276, filed on May 30, 2014.

(30) Foreign Application Priority Data

May 31, 2013  (GB) .................................... 1309716.7
Aug. 21, 2013 (GB) .................................... 1314999.2

(51) Int. Cl.
*G07C 5/00* (2006.01)
*G07C 5/02* (2006.01)
(Continued)

(52) U.S. Cl.
CPC ............... *G07C 5/008* (2013.01); *G07C 5/02* (2013.01); *G07C 5/0808* (2013.01);
(Continued)

(58) Field of Classification Search
CPC ...... G07C 5/0808; G07C 5/0858; G07C 5/12; H04W 4/008
See application file for complete search history.

(56) References Cited

U.S. PATENT DOCUMENTS 6,356,823 B1    3/2002  Iannotti
6,542,818 B1    4/2003  Oesterling
(Continued)

FOREIGN PATENT DOCUMENTS

CN    20210428  U    1/2012
CN    102436629 A    5/2012
(Continued)

OTHER PUBLICATIONS

International Search Report of International Application No. PCT/EP2014/061275 dated Sep. 4, 2014.
(Continued)

*Primary Examiner* — Michael D Lang

(57) ABSTRACT

A wireless communication device for collecting vehicle on-board diagnostics (OBD) data is disclosed, together with associated methods of handling OBD data in such wireless communication devices. In embodiments, the wireless communication device is arranged to determine when it has been disconnected from the vehicle OBD port and to correct previously stored time-stamped OBD data by synchronising with an external reference clock signal provided by an external mobile telecommunications device before the corrected OBD data is transmitted to the external device. In other embodiments, the wireless communication device comprises a processor configured to aggregate collected
(Continued)

OBD data into risk profile data comprising one or more scalar indicators and/or histogram indicators, and the device is further arranged to store the risk profile data in memory until the device is paired with an external mobile telecommunications device and a data transmission instruction is received. In yet other embodiments, the wireless communication device comprises an accelerometer and a processor configured to determine an orientation of the accelerometer relative to the vehicle based on the OBD data.

19 Claims, 9 Drawing Sheets

(51) Int. Cl.
    *G07C 5/08*     (2006.01)
    *G07C 5/12*     (2006.01)
    *H04W 4/80*     (2018.01)

(52) U.S. Cl.
    CPC ............ *G07C 5/0858* (2013.01); *G07C 5/12* (2013.01); *H04W 4/80* (2018.02)

(56) References Cited

U.S. PATENT DOCUMENTS

| | | |
|---|---|---|
| 8,494,710 B2 | 7/2013 | Harvie |
| 8,838,362 B2 | 9/2014 | Higgins et al. |
| 8,954,226 B1 | 2/2015 | Binion |
| 2006/0022842 A1 | 2/2006 | Zoladek |
| 2006/0106510 A1 | 5/2006 | Heffington |
| 2007/0088465 A1 | 4/2007 | Heffington |
| 2008/0033609 A1 | 2/2008 | Razavi |
| 2009/0043444 A1 | 2/2009 | Gettner |
| 2010/0087981 A1 | 4/2010 | Orozco-Perez |
| 2010/0318257 A1 | 12/2010 | Kalinadhabhotla |
| 2011/0098880 A1 | 4/2011 | Basir et al. |
| 2011/0130906 A1 | 6/2011 | Mayer |
| 2011/0130916 A1 | 6/2011 | Mayer |
| 2012/0203441 A1 | 8/2012 | Higgins et al. |
| 2012/0253585 A1 | 10/2012 | Harvie |
| 2013/0013348 A1 | 1/2013 | Ling et al. |
| 2013/0096731 A1* | 4/2013 | Tamari ................ G06F 11/3013 701/1 |
| 2014/0278074 A1 | 9/2014 | Annapureddy |
| 2015/0112504 A1 | 4/2015 | Binion |
| 2015/0112543 A1 | 4/2015 | Binion |
| 2015/0112731 A1 | 4/2015 | Binion |
| 2015/0112800 A1 | 4/2015 | Binion |
| 2015/0154814 A1 | 6/2015 | Kalinadhabhotla |
| 2016/0125668 A1 | 5/2016 | Meyer |
| 2016/0125669 A1 | 5/2016 | Meyer |

FOREIGN PATENT DOCUMENTS

| | | |
|---|---|---|
| DE | 102012003981 A1 | 8/2013 |
| EP | 2560146 A1 | 2/2013 |
| GB | 2498793 A | 7/2013 |
| WO | 2004040405 A2 | 5/2004 |
| WO | 2005093669 A1 | 10/2005 |
| WO | 2009068983 A2 | 8/2009 |
| WO | 2011003462 A1 | 1/2011 |
| WO | 2012038723 A1 | 3/2012 |
| WO | 2013012926 A1 | 1/2013 |

OTHER PUBLICATIONS

International Search Report of International Application No. PCT/EP2014/061276 dated Sep. 4, 2014.
Search Report of United Kingdom Application No. GB1315000.8 dated Feb. 19, 2014.
Search Report of United Kingdom Application No. GB1314998.4 dated Feb. 19, 2014.
Search Report of United Kingdom Application No. GB1314999.2 dated Feb. 18, 2014.

\* cited by examiner

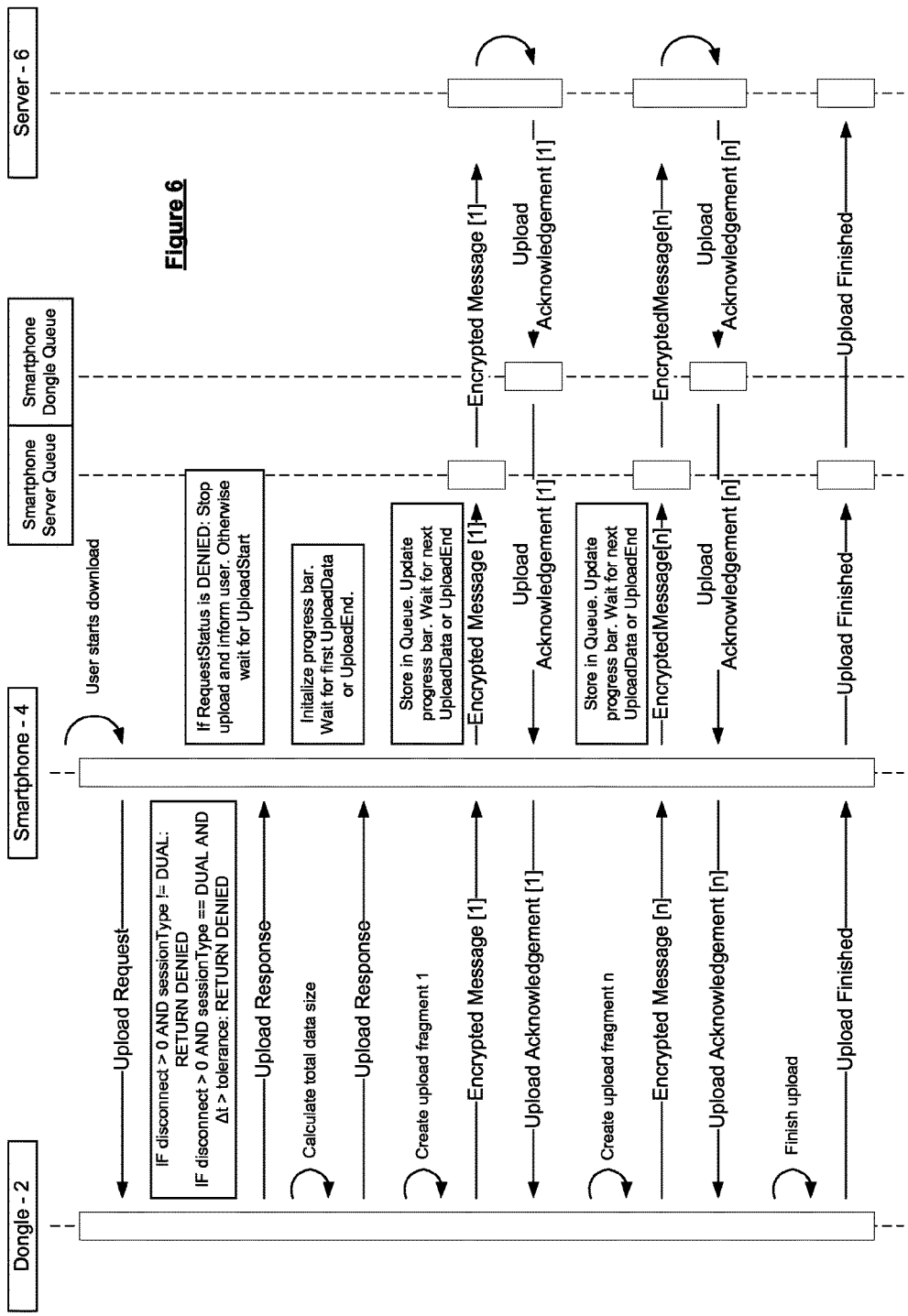

WIRELESS COMMUNICATION DEVICES

CROSS-REFERENCES TO RELATED APPLICATIONS

The present application is the National Stage of International Application No. PCT/EP2014/061276, filed May 30, 2014 and designating the United States, which claims benefit to United Kingdom Patent Applications 1309716.7 filed on May 31, 2013, and 1314999.2 filed on Aug. 21, 2013. The entire content of these applications is incorporated herein by reference.

FIELD OF THE INVENTION

The present invention relates to wireless communication devices for collecting vehicle on-board diagnostics (OBD) data and associated methods of handling OBD data in such wireless communication devices.

BACKGROUND OF THE INVENTION

A motor vehicle's on-board diagnostics (OBD) system provides self-diagnostic and reporting capability that can enable a vehicle owner or mechanic to access information about the engine and other vehicle sub-systems. All new motor vehicles are now equipped with a standard OBD-II or EOBD connector in line with regulations in force since 1996 in the USA, since 2000 for new passenger cars and LCVs in the EU, and since 2004 for HGVs in the EU. The OBD connection port in a vehicle can provide real-time engine data in addition to standardised diagnostic trouble codes which allow a mechanic to rapidly identify and remedy problems with the vehicle.

More recently, there has become available OBD data collection devices comprising a connector so as to be plugged into a vehicle's OBD port on a long-term basis to receive OBD data for a variety of purposes. For example, the TomTom ecoPLUS™ device can be installed in a vehicle belonging to a fleet so as to provide accurate information on fuel consumption and efficiency which is transmitted to an external server and displayed, for example, to a fleet manager. In another example, insurance companies may provide an OBD data collection device that plugs into a vehicle's OBD port so as to automatically track driving habits and thereby determine the insurance premium payable. This is known as usage-based insurance (UBI).

An example of a UBI data logging device is described in US 2013/0013348 A1. Such a data logging device includes a microprocessor and wireless GSM transceiver so that vehicle usage information can be transmitted to an insurer or other external entity. The data logging device includes a real-time clock so that data stored in the data log can be provided with a time stamp indicating the time of day information is received, and an internal power source that maintains the clock running. WO 2004/040405 A2 provides another example of an OBD data logging module that is configured to plug into the OBD-II port of a vehicle and has a real-time clock and on-board power supply as well as a microprocessor and memory. Even when no power is applied to the module from the OBD port in the vehicle, the real-time clock is maintained by the internal battery so that the collected OBD data can be accurately time-stamped. The module monitors driver habits and has a wireless communication interface so that OBD data can be transmitted to an external computer for interrogation.

OBD data logging devices tend to be relatively bulky because, in addition to the connector, they include a sizeable on-board memory and internal power source, e.g. battery, to power the microprocessor and real-time clock even when the device is not connected to a vehicle's OBD port. This means that such devices typically protrude from the vehicle's OBD port and can interfere with the driver, especially as the OBD port is usually positioned below a vehicle's steering column. The available space around the OBD port in most vehicles is very limited and typically not easily accessible for a user to readily connect and disconnect a device.

Accordingly, there remains a need for an improved OBD data collection device.

SUMMARY OF THE INVENTION

According to a first aspect of the invention there is provided a wireless communication device for collecting vehicle on-board diagnostics (OBD) data, the device comprising: a connector for connecting the device to a vehicle OBD port to receive OBD data and power; a processor and real-time clock powered by the connector and arranged to apply time stamps to the OBD data; a memory for storing the time-stamped OBD data; and a wireless transceiver for pairing with an external mobile telecommunications device to wirelessly transmit OBD data, wherein the wireless communication device determines when it has been disconnected from the vehicle OBD port and corrects the time-stamped OBD data by synchronising with an external reference clock signal provided by the mobile telecommunications device before the corrected OBD data is transmitted to the external mobile telecommunications device.

Such a wireless communication device is arranged to use an external mobile telecommunications device as a local gateway for the transmission of OBD data to a remote server, rather than having its own Internet connection. In fact the wireless communication device preferably does not include an Internet connection, e.g. a mobile telecommunications device, such as a GSM or GPRS device, for communicating with a remote server. This means that a user can control the transmission of OBD data from the device by deciding when to pair a mobile telecommunications device that does provide such an, e.g. Internet, connection. User privacy is thereby enhanced. Furthermore it will be appreciated that the wireless communication device does not require an internal power supply to keep the real-time clock running when the device is not connected to a vehicle OBD port. If the wireless communication device is disconnected and then later reconnected to a vehicle OBD port, the internal real-time clock will re-commence timing once power is received again. OBD data that is received after re-connection will be given time stamps that are now out of sync with the real world time. However the accuracy of the OBD data is not affected by disconnection because the device actively synchronises with an external reference clock signal so as to correct the time-stamped data before it is transmitted to the external mobile telecommunications device. A wireless communication device without an internal power supply, such as a battery, may be made significantly more compact than conventional OBD data collection devices. In fact, such a wireless communication device may be small enough to be seated inside the recess of a standard OBD port without protruding.

According to a second aspect of the present invention there is provided a method for correcting vehicle on-board diagnostics (OBD) data collected by a wireless communication device that does not have an internal power supply, the method comprising: receiving OBD data and power from a vehicle OBD port; processing the OBD data by applying time stamps using a real-time clock internal to the device; storing the time-stamped OBD data in a memory; determining when the device has been disconnected from a vehicle OBD port; requesting synchronisation with an external reference clock signal when the device is wirelessly paired with a mobile telecommunications device; calculating a time correction factor; and correcting the stored time-stamped OBD data before the corrected OBD data is transmitted to the external mobile telecommunications device.

After synchronising with the external reference clock signal, the method may further comprise the step of transmitting the corrected OBD data from the wireless communication device to the external mobile telecommunications device. Optionally, the method may further comprise resetting the real-time clock after the corrected OBD data has been transmitted from the wireless communication device. In addition, or alternatively, the method may optionally further comprise deleting the OBD data from the device's memory after the corrected OBD data has been transmitted from the wireless communication device.

In certain embodiments, the device may determine when it has been disconnected from a vehicle OBD port by determining that power has been disconnected from the connector. Optionally, the disconnection event may be given a time stamp by the real-time clock. The disconnection event may then be logged with a time stamp in the device's memory. One or more disconnection events may take place before the wireless communication device is next paired with an external mobile telecommunications device. The time stamps of the disconnection events can be used to calculate the time that elapsed before the device was re-connected and therefore the applicable time correction factor. It will be appreciated that time-stamped data collected between different disconnection events may therefore be corrected using a different time correction factor once the device synchronises with an external reference clock signal.

It is a preferred feature of the present invention that the wireless communication device does not include its own connection to a telecommunications network, e.g. GSM, GPRS or the like. Unlike conventional UBI data collection devices, user privacy is respected by avoiding real-time tracking of driver habits. Instead it is under the user's control to pair a mobile telecommunications device with the wireless communication device that is collecting OBD data. As the wireless communication device is preferably not continuously paired with an external mobile telecommunications device, the time-stamped OBD data must be stored in the device's memory until a later time when a data transmission instruction is received. It is therefore preferable that the wireless transceiver is arranged to communicate a batch of stored OBD data when the wireless communication device is paired with a mobile telecommunications device. The wireless transceiver is preferably a short-range transceiver using infrared or radio frequency communication, e.g. Bluetooth protocol. Of course the mobile telecommunications device preferably includes a corresponding wireless transceiver configured with the same protocol.

When a mobile telecommunications device is paired with the wireless communication device, the device carries out the clock synchronisation process whenever it determines that the time-stamped OBD data is out of sync because it has been disconnected (one or more times) from the vehicle's OBD port since the last time it was paired. Either the wireless communication device or the mobile telecommunications device may initiate clock synchronisation. Once the time-stamped data has been corrected by synchronising with the external reference clock signal, the mobile telecommunications device preferably communicates a data transmission instruction to the wireless communication device. In one set of embodiments the mobile telecommunications device may automatically instruct transmission of the corrected OBD data whenever it pairs with the wireless communication device and the clock synchronisation process has been completed. In another set of embodiments, the mobile telecommunications device may communicate a data transmission instruction to the wireless communication device when commanded to do so by a user. This provides a user with flexibility in deciding when data is transmitted from the wireless communication device. However it is desirable that OBD data is not stored indefinitely in the memory of the wireless communication device, especially so that the size of the memory can be limited. The mobile telecommunications device may therefore prompt a user to instruct transmission of OBD data from the wireless communication device when it determines that no OBD data has been received for a certain period of time, e.g. over 20 days.

The OBD data received by the mobile telecommunications device may optionally be displayed to a user. While the devices are paired, the user may be provided with real-time driving feedback, e.g. via an app running on the mobile telecommunications device. In some embodiments the OBD data may not be shared with a third party. However, in a preferred set of embodiments the mobile telecommunications device acts as a gateway for uploading the OBD data to an external server. The mobile telecommunications device may therefore provide the dual functions of providing user feedback and an internet connection to share the OBD data with backend support. While the wireless communication device logs data without needing its own internal power supply, the mobile telecommunications device conveniently provides an external reference clock signal to ensure integrity of the OBD data before it is uploaded to the network. The external server can ensure secure long-term storage of the uploaded OBD data.

The present invention therefore extends to a collection system for vehicle on-board diagnostics (OBD) data, the system comprising: (a) a wireless communication device for collecting OBD data, the device comprising a connector for connecting the device to a vehicle on-board diagnostics (OBD) data port to receive OBD data and power, a processor and real-time clock powered by the connector and arranged to apply time stamps to the OBD data, and a memory to store the time-stamped OBD data; and (b) a mobile telecommunications device for pairing with the wireless communication device and uploading OBD data to an external server; wherein the wireless communication device determines when it has been disconnected from the vehicle OBD port and corrects the time-stamped data by synchronising with an external reference clock signal provided by the mobile telecommunications device before the corrected data is transmitted from the wireless communication device to the mobile telecommunications device. The system may further comprise (c) the external server that receives OBD data uploads from the mobile telecommunications device. The external server may provide reports to the user and/or a third party such as an insurance company.

As is mentioned above, preferably the mobile telecommunications device provides a user interface for a user to control when the OBD data is uploaded. In addition, or alternatively, the mobile telecommunications device preferably provides a display for OBD data. The mobile telecommunications device, such as a smartphone, may therefore give feedback to a user while he or she is driving.

The mobile telecommunications device may display one or more types of OBD data selected from, for example, vehicle speed, engine rpm, fuel system status, calculated engine load, engine coolant temperature, intake manifold pressure, intake air temperature, throttle position, engine torque, and fuel rate. Such OBD data may be displayed in real-time when the mobile telecommunications device is paired with the OBD data collection device. The mobile telecommunications device may use the OBD data to calculate and display feedback information in relation to driving events and/or fuel consumption. The mobile telecommunications device may optionally display trip-related data such as trip duration and/or distance.

Preferably the wireless communication device does not include a GPS receiver (or other location determining means) so that the vehicle's actual movements are not tracked by the device, again to respect user privacy. Without such location, e.g. GPS, data the wireless communication device can not directly determine a distance travelled. In a preferred set of embodiments the wireless communication device calculates a distance travelled by the vehicle based on OBD data relating to vehicle speed, e.g. providing a virtual odometer. The mobile telecommunications device may display the calculated distance travelled as a virtual odometer reading. Preferably a user is prompted by the mobile telecommunications device to verify the virtual odometer reading, e.g. through comparison with the mileage displayed on the dashboard odometer. Based on user feedback, the mobile telecommunications device may send an odometer calibration signal to the wireless communication device. The wireless communication device may use the calibration signal to calibrate its calculation of the distance travelled by the vehicle based on OBD data such as vehicle speed. This enhances the sensitivity of the virtual odometer.

The wireless communication device's virtual odometer may furthermore be used to inform risk profile data, that is, indicators of driver and/or vehicle performance that can be extracted from the OBD data. In a preferred set of embodiments the wireless communication device does not simply collect OBD data and apply time stamps to the OBD data. Preferably the processor is arranged to aggregate the OBD data into risk profile data comprising one or more scalar indicators and/or histogram indicators. Aggregating the raw OBD data into risk profile data advantageously reduces the amount of memory required in the wireless communication device. This makes it easier for the device to store data for an extended period of time, e.g. up to 10 days, 20 days, 30 days, 40 days or even 50 days, before being transmitted to a mobile telecommunications device. As a result the wireless communication device can be kept compact in size.

This is considered novel and inventive in its own right, and thus when viewed from a third aspect of the invention there is provided a wireless communication device for collecting vehicle on-board diagnostics (OBD) data, the device comprising: a connector for connecting the device to a vehicle OBD port to receive OBD data; a processor configured to aggregate the OBD data into risk profile data comprising one or more scalar indicators and/or histogram indicators; a memory for storing the risk profile data; and a wireless transceiver for pairing with an external mobile telecommunications device to wirelessly transmit risk profile data, wherein the wireless communication device is arranged to store the risk profile data in the memory until the wireless communication device is paired with a mobile telecommunications device and a data transmission instruction is received.

As is mentioned above, aggregating the OBD data into risk profile data can optimise the device's data storage capacity. The memory may have a storage capacity, e.g. of only 4 MB or less, while the wireless communication device is not reliant on a real-time data link with an external mobile telecommunications device. Furthermore a user decides if and when to transmit the risk profile data rather than driving performance being automatically tracked. In addition, aggregating the OBD data can also reduce the mobile bandwidth requirement when the risk profile data is transmitted to an external mobile telecommunications device.

According to a fourth aspect of the present invention there is provided a method for aggregating vehicle on-board diagnostics (OBD) data collected by a wireless communication device, comprising: receiving OBD data from a vehicle OBD port; aggregating the OBD data into risk profile data comprising one or more scalar indicators and/or histogram indicators; storing the risk profile data in a memory until the wireless communication device is paired with an external mobile telecommunication device and a data transmission instruction is received; and, after receiving a data transmission instruction, wirelessly transmitting the risk profile data to the external mobile telecommunication device.

In embodiments according to the third and fourth aspects of the invention, the wireless communication device preferably also includes a real-time clock to apply time stamps to the OBD data. The real-time clock may be provided with a back-up power supply internal to the device, e.g. a battery, so that the clock keeps running even if the device is disconnected from the vehicle OBD port. However, to keep the wireless communication device compact, it is preferable that the device that does not have an internal power supply. In these embodiments the method may further comprise: determining when the device has been disconnected from a vehicle OBD port; requesting synchronisation with an external reference clock signal when the device is paired with the mobile telecommunications device; calculating a time correction factor; and correcting the risk profile data before wirelessly transmitting the risk profile data to the external mobile telecommunication device. Optionally, the method may further comprise resetting the real-time clock after the risk profile data has been transmitted from the wireless communication device. In addition, or alternatively, the method may optionally further comprise deleting the risk profile data from the device's memory after the risk profile data has been transmitted from the wireless communication device.

The risk profile data may be stored in the memory for several days or weeks between data transmission instructions. For example, the memory may be capable of storing risk profile data for up to 20 days, 30 days, 40 days and preferably up to 45 or 50 days. This means that a data transmission instruction only needs to be received by pairing the devices around once a month, which is particularly suited to infrequent drivers.

In a set of embodiments the mobile telecommunications device may automatically send a data transmission instruction whenever it pairs with the wireless communication device. In another set of embodiments, the mobile telecommunications device may communicate a data transmission instruction to the wireless communication device only when commanded to do so by a user. This provides a user with flexibility in deciding when data is transmitted from the wireless communication device. However the mobile telecommunications device preferably prompts a user to provide a data transmission instruction when it determines that no risk profile data has been received for a certain period of time, e.g. over 20 days.

The wireless communication device may collect and aggregate a number of different types of OBD data relating to vehicle use and/or driving performance to provide the risk profile data.

Preferably each scalar indicator represents a single average value for a particular category of OBD data in a given time period. For example, the time period may be 24 hours. The scalar indicator(s) therefore provide risk profile data aggregated on a daily basis. When the risk profile data is transmitted from the wireless communication device, e.g. to be uploaded to an external server, then the scalar indicators can provide a long-term overview of vehicle usage with a daily granularity. For a scalar indicator the particular category of OBD data may be chosen from one or more of: (i) distance travelled i.e. mileage; (ii) driving time; (iii) idling time; (iv) number of trips; (v) trip duration; (vi) trip distance; and (vii) number of cold starts.

Preferably each histogram indicator represents the distribution of a particular category of OBD data in one or more given ranges. For example, the OBD data relating to trip duration may be aggregated and histogrammed in time ranges, e.g. <10 mins, <30 mins, <1 hour, <2 hours, and >2 hours, to provide a histogram indicator of the distribution of trip durations. The risk profile data including such histogram indicators can therefore provide an overview of performance indicators such as braking events, average trip duration, driving time by time of day, and driving time by vehicle speed. For a histogram indicator the particular category of OBD data may be chosen from one or more of: (i) average vehicle speed; (ii) maximum vehicle speed; (iii) acceleration; (iv) deceleration; (v) driving time; (vi) distance travelled, i.e. mileage; (vii) trip duration; (viii) trip distance; (ix) braking force; (x) engine revolutions; (xi) engine load; (xii) engine torque; (xiii) throttle position; (xiv) engine temperature; (xv) intake manifold pressure; (xvi) intake air temperature; and (xvii) fuel rate.

The histogram indicator(s) may be chosen from one or more of: (i) number of trip durations in a given time range; (ii) number of trip distances in a given distance range; (iii) duration of driving time in a given speed range; (iv) duration of driving time in a given period of the day; (v) distance travelled i.e. mileage in a given speed range; (vi) distance travelled, i.e. mileage in a given period of the day; (vii) number of braking events in a given braking force range; (viii) engine running time with revolutions in a given rpm range; (ix) engine running time with load in a given load range; (x) engine running time with temperature in a given temperature range; and (xi) duration of driving time in a given range of throttle position.

The risk profile data may also comprise additional indicators such as acceleration force, cornering force (right) and cornering force (left). The histogram indicator(s) may further include: (i) number of acceleration events in a given force range; and/or (ii) number of cornering events in a given force range. Any suitable acceleration sensor may be used to provide such data. Although the acceleration data may be supplied to the wireless communication device from an external sensor, preferably the wireless communication device further comprises an accelerometer for this purpose.

In fact it is a preferable feature of any aspect of the invention for the wireless communication device to include an acceleration sensor or accelerometer. The accelerometer may be configured to detect a crash event, e.g. when the measured acceleration/deceleration force exceeds a certain threshold. In all such embodiments the wireless communication device may further store data relating to a detected crash event, such as one or more of: acceleration value; acceleration direction; distance travelled at time of crash; and OBD data such as vehicle speed, engine rpm, throttle position, engine load, etc. It is preferable for the crash event data to be given a time stamp by the device's real-time clock. If the device does not have an internal power supply, as is preferable, then the time stamp can be corrected if necessary as described above. The device preferably stores crash event data for a time period before the event, e.g. up to 30 or 45 seconds before the event, and/or for a time period after the event, e.g. up to 15 seconds after the event. The crash event is logged in the device's memory until it is paired with a mobile telecommunications device and the data is transmitted.

As is mentioned above, in embodiments of the present invention it is preferable that the wireless communication device does not include a global navigation satellite system (GNSS) receiver, e.g. a GPS receiver, or any other location determining device, so that the vehicle's location can not be tracked as part of the data collected by the communication device. This enhances user privacy. However communication devices that use an accelerometer, e.g. to detect a crash event, typically rely on location data, in particular speed and direction, for calibration. This is because the orientation of the communication device relative to the vehicle may not be known. The same communication device might be used in different vehicles that have OBD ports installed at different positions and/or angles. It is known, for example from WO 2011/003462 A1, to use a location determining device such as a GPS device to calibrate a vehicle accelerometer device; the entire content of this application is incorporated herein by reference. However there remains a need for a wireless communication device to be able to calibrate an acceleration sensor or accelerometer without relying on GNSS or other location data.

Preferably the wireless communication device comprises an accelerometer and a processor arranged to process OBD data received from the vehicle OBD port and to determine an orientation of the accelerometer based on the OBD data. Preferably such a device does not include a GPS receiver or other location determining means. Accordingly the device is able to calibrate the accelerometer using only OBD data, e.g. self-calibration. Once the processor has determined an orientation of the accelerometer, it can transform acceleration data measured by the accelerometer from the frame of reference of the device to the frame of reference of the vehicle. The device is therefore able to calibrate itself to take into account its orientation in the vehicle.

This is considered novel and inventive in its own right, and thus when viewed from a fifth aspect of the invention there is provided a device for collecting vehicle on-board diagnostics (OBD) data, the device comprising: a connector for connecting the device to a vehicle OBD port to receive OBD data; an accelerometer; and a processor configured to determine an orientation of the accelerometer relative to the vehicle based on the OBD data. Preferably the device is a wireless communication device for collecting vehicle on-board diagnostics (OBD) data, and the device comprises a wireless transceiver for pairing with an external mobile telecommunications device to wirelessly transmit OBD data.

It follows that the device therefore has no fixed installation requirements in the vehicle. As compared to prior art systems that rely on a GNSS receiver, e.g. GPS receiver, to determine the orientation of an accelerometer, such a communication device instead takes advantage of the OBD data collected from the vehicle OBD port. The Applicant has recognised that this makes it possible to omit a GPS receiver altogether. Indeed, as is mentioned above, preferably the device does not include a GPS receiver or other location determining means.

By determining an orientation of the accelerometer relative to the vehicle, the processor may further be configured to rotate an acceleration vector measured by the accelerometer to fit the coordinate system of the vehicle. Any suitable OBD data can be used to determine an orientation of the accelerometer, as long as the processor is able to use the OBD data to accurately determine a vector property of motion of the vehicle, such as acceleration and/or velocity. In broadest terms, the processor may be configured to determine that at least one OBD data satisfies at least one predetermined condition in a predetermined time period so as to indicate vehicle direction. Once the processor has ascertained vehicle direction then it can compare the vehicle direction with an acceleration vector measured by the accelerometer to obtain an angle of orientation of the accelerometer with respect to the vehicle.

The at least one predetermined condition may comprise a condition that a vehicle trajectory property determined from the OBD data matches a vehicle trajectory property measured by the accelerometer. If the vehicle includes its own accelerometer then the OBD data may comprise acceleration and/or deceleration data. If, for example, the processor determines that acceleration data measured by the device's accelerometer matches acceleration data received from the OBD port then the device frame of reference may be considered to be oriented in line with the vehicle frame of reference. However, in practice this may rarely occur. In a preferred set of embodiments the processor is configured to determine an orientation of the accelerometer based on velocity data received from the vehicle OBD port. Such self-calibration may use the direction of an OBD speed vector to inform the processor that the vehicle is moving along a straight line at any instant in time.

So as to reliably detect when the vehicle is moving in a straight line, the processor may look for a linear vehicle acceleration or deceleration, e.g. breaking event. In one example, the at least one predetermined condition may comprise a condition that vehicle acceleration determined from the OBD data has a magnitude greater than a predetermined threshold magnitude of acceleration in the predetermined time period. In one example, the at least one predetermined condition may comprise a condition that the vehicle acceleration magnitude determined from the OBD data varies by less than a predetermined amount or proportion in the predetermined time period. In one example, the at least one predetermined condition may comprise a condition that a direction of acceleration determined from the OBD data has an angular variation less than a predetermined threshold angle in the predetermined time period. In one example, the at least one predetermined condition may comprise a condition that a direction of velocity or acceleration determined from the OBD data is substantially constant in the predetermined time period.

The processor is preferably configured to determine when the magnitude of an OBD speed vector is increasing or decreasing for longer than a predetermined time period, e.g. a minimum threshold of three seconds. Further preferably the processor is configured to monitor the OBD speed vector in the xy-plane, determining when the vector has a constant direction indicating linear movement of the vehicle in the x-direction, e.g. aligned with the vehicle's forward direction of motion or braking direction. A variance in the direction of the OBD speed vector may be calculated, and compared by the processor to a limit, to ensure accuracy. During this time the processor may also monitor that the OBD speed vector has a magnitude that remains above a threshold value. The processor is then able to compare the direction of an acceleration vector measured by the accelerometer with the determined x-direction of the vehicle, and produce a calibration constant corresponding to the z-rotation between the two frames of reference. This calibration constant can be used by the processor to transform acceleration data measured by the accelerometer to the vehicle frame of reference before it is transmitted to an external mobile telecommunications device.

Accordingly the device is able to automatically calibrate, i.e. learn the relative orientation of the accelerometer, so as to be able to accurately identify acceleration/deceleration, cornering and/or braking events. The accelerometer is preferably arranged to detect a crash event. For example, a crash event may be indicated by detecting an acceleration/deceleration force greater than a predetermined threshold value, e.g. >1.5 g. As is discussed above, the device may comprise a memory for storing data and a crash event may be logged in the device's memory until it is paired with a mobile telecommunications device and the OBD data is transmitted. It will be appreciated that the accelerometer may be integrated with the processor. Where a memory is provided, this may be integrated with the processor and/or accelerometer.

According to a sixth aspect of the present invention there is provided a method for determining an orientation of an accelerometer in a device for collecting vehicle on-board diagnostics (OBD) data, the method comprising: receiving vehicle on-board diagnostics (OBD) data from a vehicle OBD port; processing the OBD data to determine when the vehicle is accelerating or decelerating in a straight line; and comparing the direction of acceleration or deceleration with an acceleration vector measured by the accelerometer to determine the orientation of the accelerometer relative to the vehicle.

It will be appreciated that such a method is unique as it relies upon OBD data to determine the orientation of the accelerometer relative to the vehicle. The device therefore has no fixed installation requirements in the vehicle. Preferably the device does not include a GPS receiver or other location determining means.

The determined orientation may be expressed as a set of angular values. The determined orientation may be representative of the pitch and/or roll angle of the accelerometer with respect to the vehicle. Preferably the determined orientation is representative of the yaw angle of the accelerometer with respect to the vehicle, e.g. representative of a z-rotation relative to the xy-plane of the vehicle.

There will now be described some general features that may apply to any of the aspects and embodiments of the invention outlined above.

Optionally the wireless communication device determines the state of the vehicle engine. This may be achieved through voltage sensing. The state of the engine can be used to determine the start and end of a trip, and hence trip duration. When it is determined that the engine is not running then, after a certain time period, the device enters a sleep mode in which no power is taken from the vehicle. The device therefore saves power in between trips. The device may be woken from its sleep mode by determining a change of engine state and/or by receiving a pairing request from an external mobile telecommunications device.

Optionally the wireless communication device receives firmware updates when it is paired with an external mobile telecommunications device.

Optionally the wireless communication device is configured to encode data before it is transmitted to an external mobile telecommunications device. Preferably the transmitted data is secured using end-to-end signing of the data. This prevents unauthorised interception and use or modification of the data. Preferably the transmitted data is secured using end-to-end encryption. An advantage of end-to-end encryption is that neither an attacker nor the user himself can decode the data. The device may provide a unique encryption key so that an external server can verify the origin of uploaded data.

Optionally the wireless communication device detects vehicle identification information whenever it is connected to a vehicle OBD port. If there is a change in the vehicle identification information then the device flags this up. The device therefore alerts a user when it has been moved to a different vehicle.

It will be understood that all of the features above relate to a wireless communication device during use, i.e. when it is connected to a vehicle OBD port.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which:

FIG. 6 illustrates a process for uploading data from a wireless communication device;

DETAILED DESCRIPTION OF THE PREFERRED EMBODIMENTS

Figure 1:
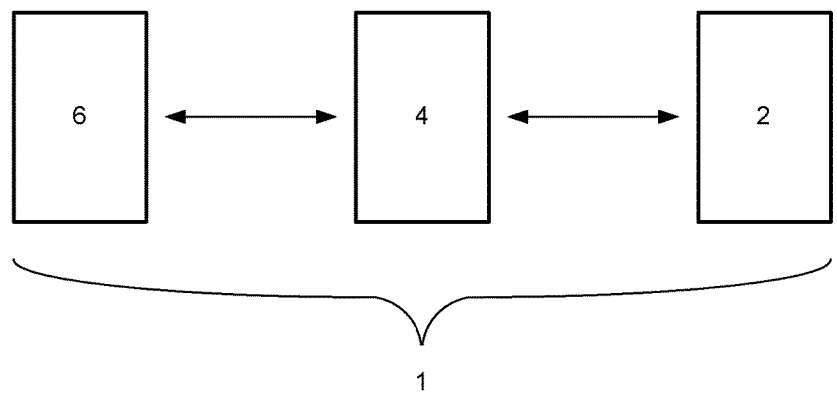
FIG. 1 is a schematic overview of a collection system for vehicle on-board diagnostics (OBD) data.

From FIG. 1 it will be understood that a collection system 1 for vehicle on-board diagnostics (OBD) data generally comprises a wireless communication device or dongle 2, a mobile telecommunications device such as a smartphone 4, and an external server 6. While the dongle 2 collects OBD data from a vehicle OBD port, it is a user's smartphone 4 that provides user interaction and data transmission. The dongle 2 may pair with the smartphone 4 using Bluetooth or other short-range wireless communication protocol. Long-term storage of OBD data and risk profile data is provided by the external server 6 so as to ensure data security and integrity.

Figure 2:
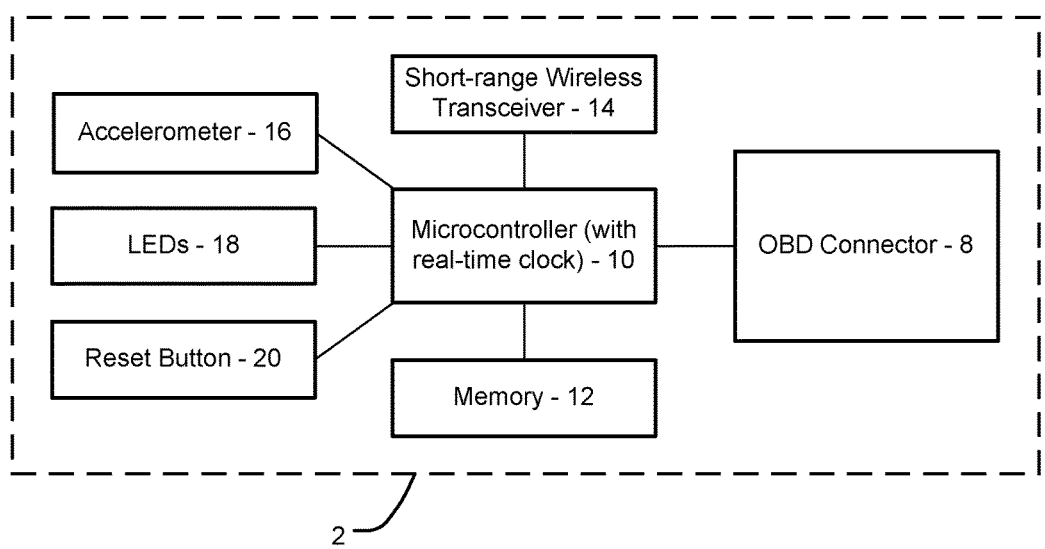
FIG. 2 is a block diagram of an exemplary a wireless communication device for use in such a system.

An exemplary wireless communication device or dongle 2 is seen from FIG. 2 to include a physical connector 8 that can mate with a vehicle OBD port to receive OBD data and power. The internal components of the dongle 2 comprise a processor 10 (such as a microcontroller), which includes a real-time clock, a memory 12 (such as a flash memory), a wireless (e.g. Bluetooth) transceiver 14, an optional accelerometer 16, one of more LEDs or other indicators 18, and a reset button 20. The real-time clock is arranged to apply time stamps to the collected OBD data before it is stored in the memory 12. The microcontroller 10 may aggregate the OBD data into risk profile data before it is stored in the memory 12, as will be described in more detail below.

Figure 3A:
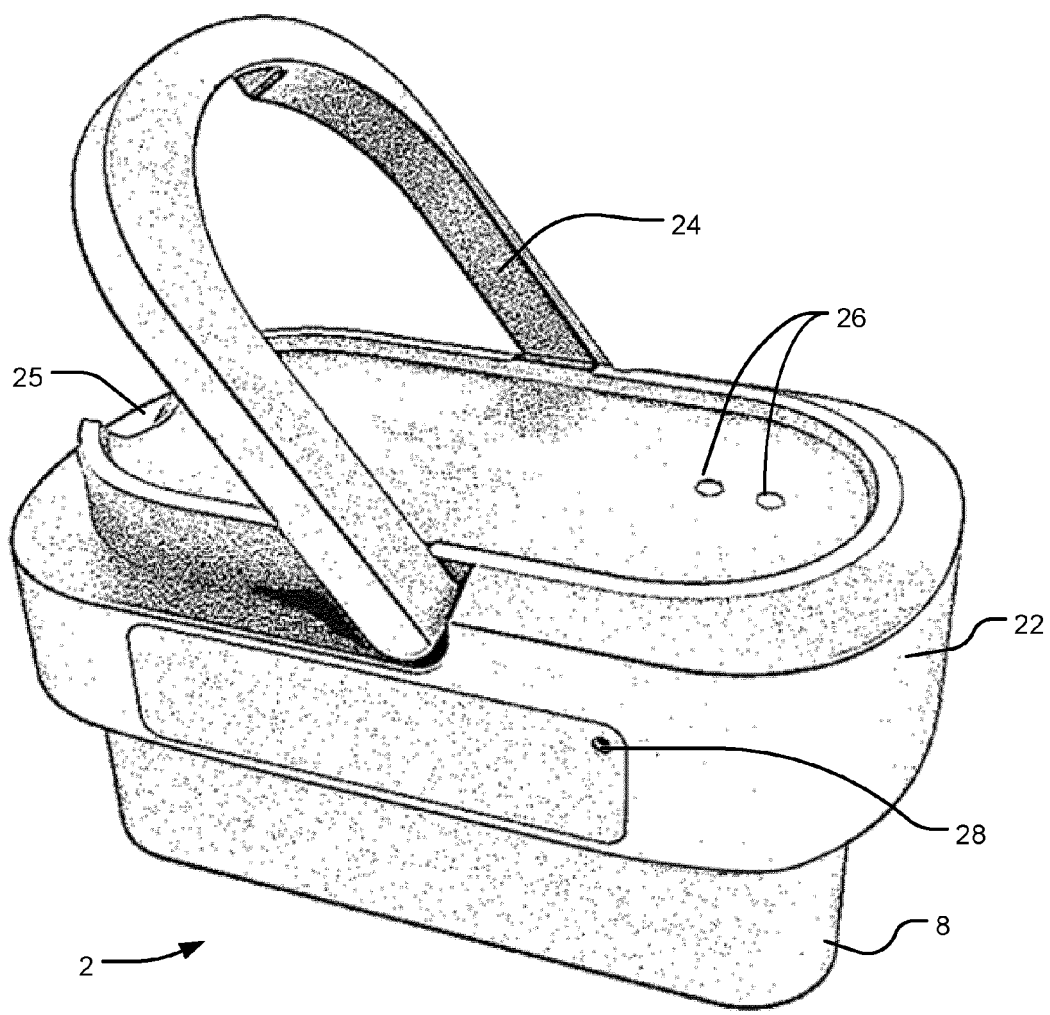
FIGS. 3A to 3C illustrate various possible physical embodiments of such a wireless communication device.
Figure 3B:
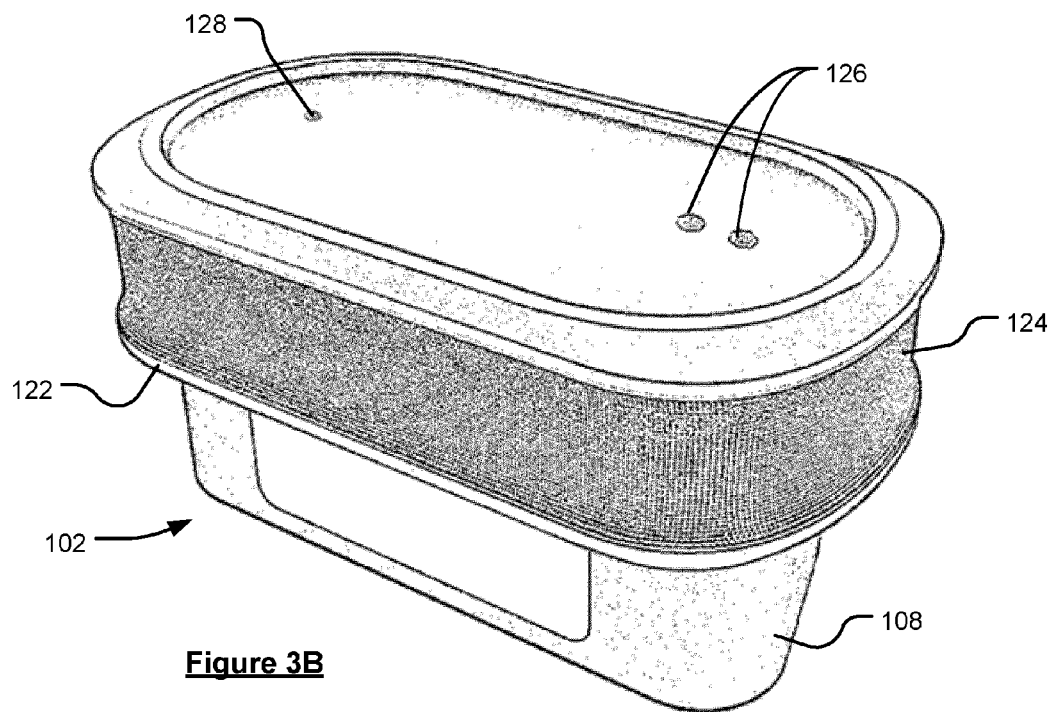
Figure 3C:
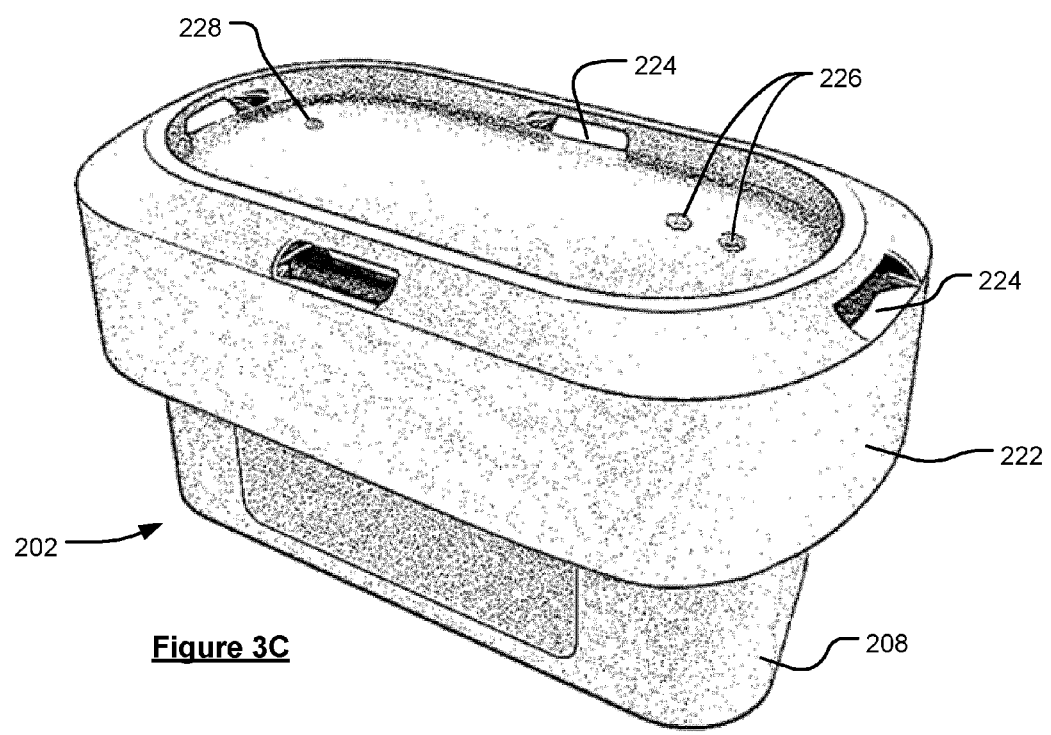

Some possible physical embodiments of such a dongle 2 are shown in FIGS. 3A to 3C. In FIG. 3A the dongle 2 has the connector 8 integrated with a housing 22 for the internal components. A handle 24 is hingedly connected to the housing 22 so that a user can easily remove the dongle 2 by lifting the handle 24 to pull the connector 8 out of a vehicle OBD port. The handle 24 is flush with an upper surface of the housing 22 when it is not in use and a fingernail indentation 25 in the housing 22 enables a user to lift the handle 24 up. Two LEDs 26 visible on the upper surface of the housing 22 can inform a user about the status of the dongle 2. A reset switch 28 is provided on a side of the housing 22. In FIG. 3B the dongle 102 is similar, comprising a connector 108, housing 122 and indicator LEDs 128. However in this embodiment the dongle 102 is designed to be removed from a vehicle OBD port by a user grabbing the housing 122, which has a recessed groove 124 around its perimeter to aid with gripping. A reset switch 128 is provided on the upper surface of the housing 122 so that it is not accidentally pressed when a user grabs the dongle 102. In FIG. 3C the dongle 202 comprises a connector 208 and housing 222, with indicator LEDs 228 and a reset switch 228 provided on an upper surface of the housing 222. In this embodiment the housing 222 is provided with a number of apertures 224 that enable a cable or lanyard to be threaded through, so that a user can pull the cable of lanyard to release the dongle 202 from a vehicle OBD port. In all of these embodiments the height of the dongle 2 is only 20-25 mm, in particular 24-25 mm, so that dongle 2 does not unduly protrude from the recess of a vehicle OBD port.

Figure 4:
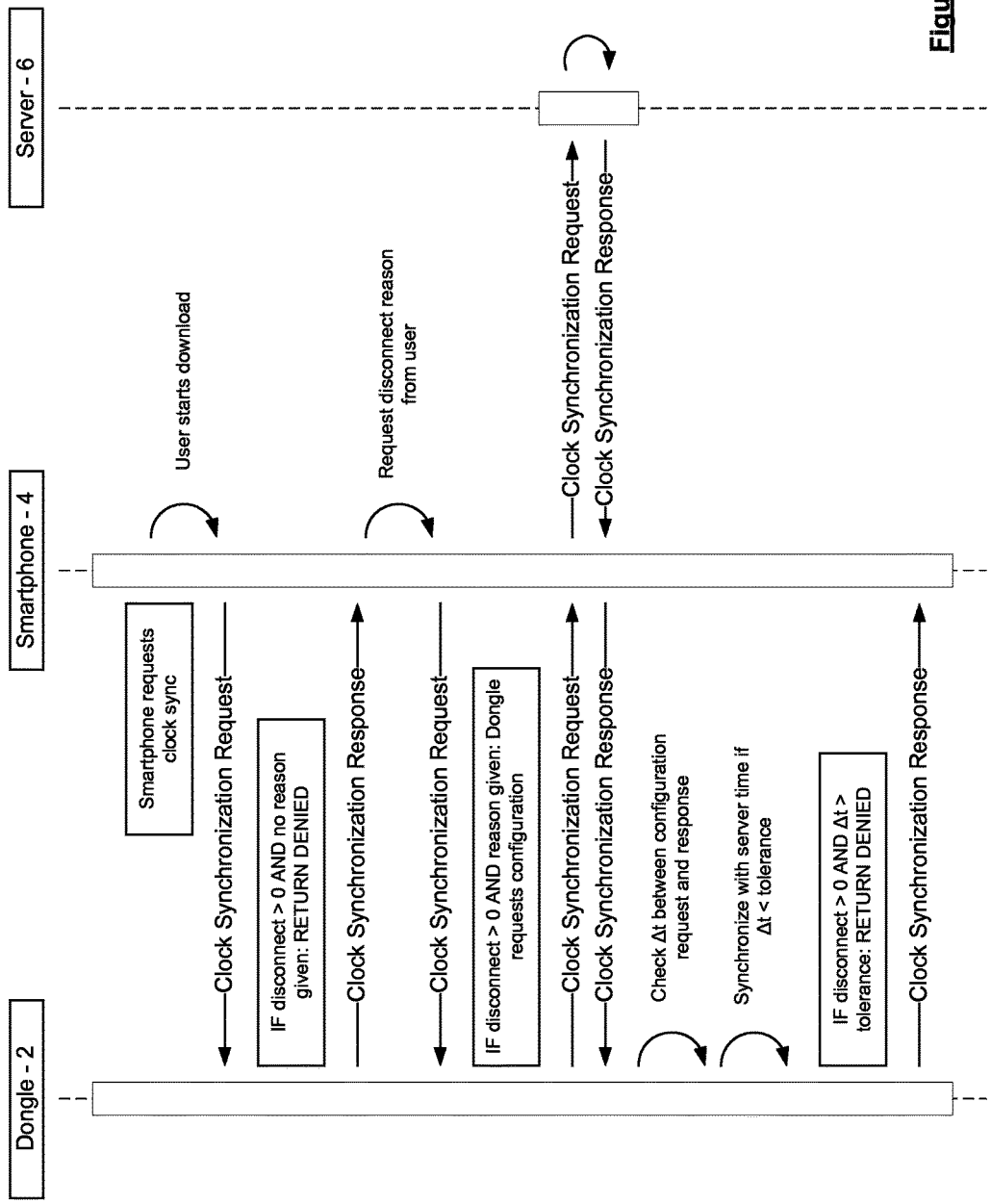
FIG. 4 illustrates a process for clock synchronisation.

FIG. 4 illustrates how the dongle 2 uses external clock synchronisation to correct the time stamps applied by a real-time clock (RTC) without battery backup. When the dongle 2 is paired with a smartphone 4, the smartphone 4 may initiate clock synchronisation by sending a "Clock Synchronization Request" message before any data is uploaded. The dongle 2 then determines whether or not it has been disconnected from the power supply of a vehicle OBD port since the last data upload. If the dongle 2 has been disconnected, e.g. disconnect >0, then the dongle 2 sends a "Clock Synchronization Request" message to the smartphone 4. Optionally, the dongle 2 may also require a reason for disconnect to be given by the smartphone user. The smartphone 4 transmits the "Clock Synchronization Request" message to the external server 6 and the dongle 2 waits for a "Clock Synchronization Response" message to be transmitted back via the smartphone 4. This message contains a reference clock signal which is used by the dongle 2 to synchronise the time-stamped OBD data and correct the OBD data before it is uploaded via the smartphone 4. After a successful clock synchronisation process, the dongle 2 replies to the smartphone 4 with a "Clock Synchronization Response" message containing a result code. The dongle 2 then starts uploading data stored in its memory 12 by sending an "Upload Response" message with a positive result code, as will be described with reference to FIG. 6.

Figure 5:
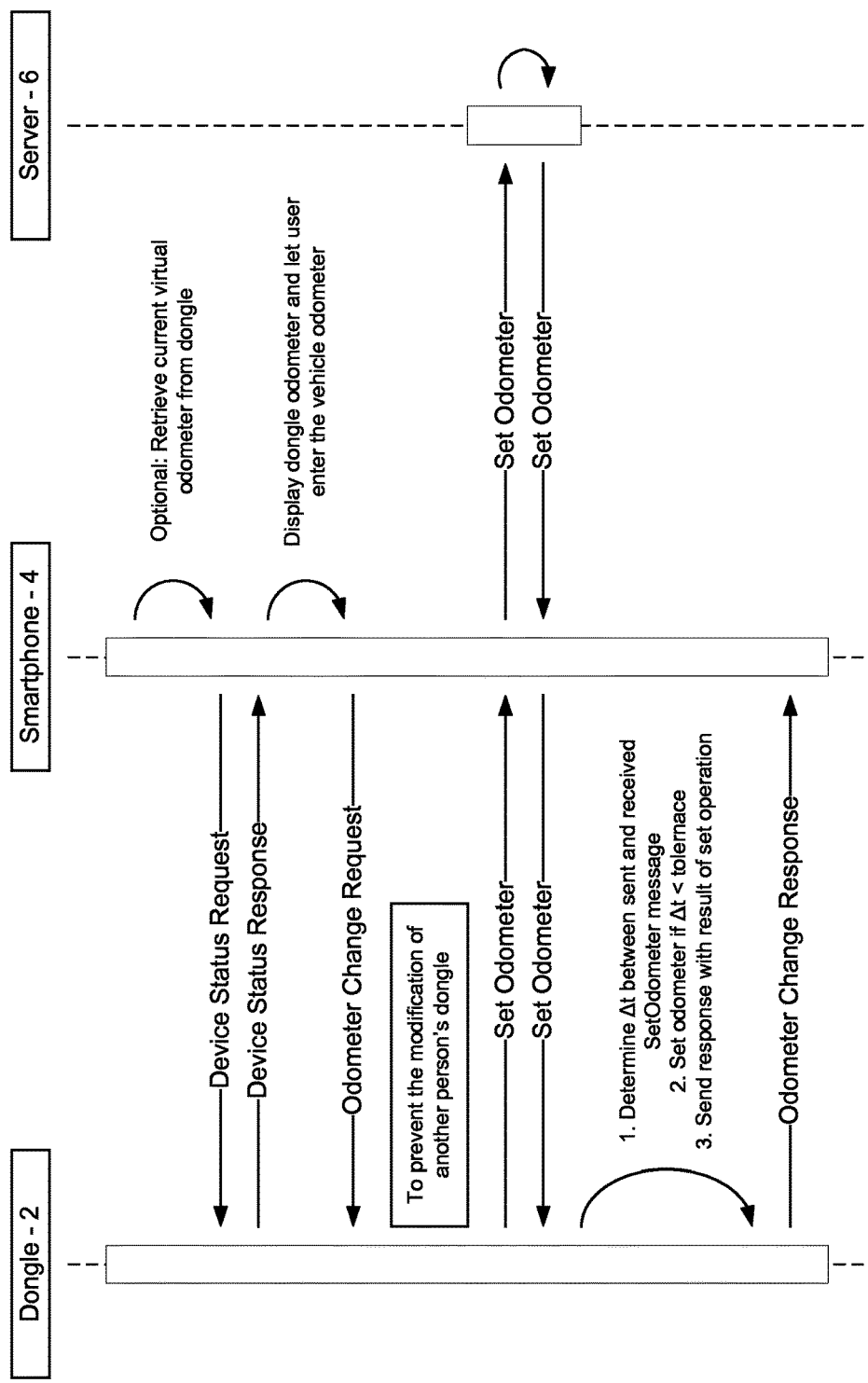
FIG. 5 illustrates a process for calibration of a virtual odometer.

FIG. 5 illustrates a process for setting the dongle's virtual odometer. The virtual odometer counts the distance driven by a vehicle based on OBD data received from the vehicle OBD port, namely vehicle speed in combination with the driving time counted by the real-time clock. The odometer readings are stored in the dongle's memory 12. When the dongle 2 is paired with a smartphone 4, it is first checked whether there is a dual session, i.e. the smartphone 4 has an Internet connection with the external server 6. This is to provide security when changing the dongle's odometer. The smartphone 4 displays the dongle's virtual odometer reading and invites a user to validate or enter the vehicle's actual odometer reading. The smartphone 4 requests the dongle 2 to change its virtual odometer by sending a "Odometer Change Request" message that contains the odometer value entered by the user. The dongle 2 sends this new odometer value to the server 6 using a "Set Odometer" message and the server then sends a "Set Odometer" response back to the dongle 2. The dongle 2 then sets the new odometer value before sending a "Odometer Change Response" message with a status indicating whether the new odometer value was set in the dongle 2. The messaging detours via the server 6 are an additional security means to prevent attackers from setting the odometer. However, this can be omitted and the odometer instead set by exchanging only four messages between the dongle 2 and smartphone 4. The odometer setting process may be carried out every time that the dongle 2 is paired with a smartphone 4 for data upload.

FIG. 6 illustrates a typical data upload process between the dongle 2, smartphone 4 and external server 6. In this example a user initiates download using the smartphone 4 and a data transmission instruction in the form of an "Upload Request" message is sent to the dongle 2. However the smartphone 4 may initiate data upload without user interaction, e.g. if automatic data upload is enabled. After receiving the "Upload Request" message, the dongle 2 first checks whether a clock synchronisation is required. If so, the dongle 2 replies with an "Upload Response" message having a result code to indicate that clock synchronisation is required and the smartphone 4 then triggers the clock synchronisation process (see FIG. 4). Otherwise, the dongle 2 starts uploading data by sending an "Upload Response" message with a positive result code, followed by several "Upload Data" messages. Each "Upload Data" message may contain data in the form of scalar performance indicators and/or histogram performance indicators. With an "Upload Finished" message the dongle 2 informs the smartphone 4 that all "Upload Data" messages have been sent and the upload process is finished. The smartphone 4 forwards the "Upload Finished" message to the server 6. The server 6 stores a time stamp when the last "Upload Finished" message is received so as to determine when to send an upload push notification to the smartphone 4 that will prompt a user to provide a data transmission instruction, e.g. if no data has been uploaded in the last 20 days.

Figure 7A:
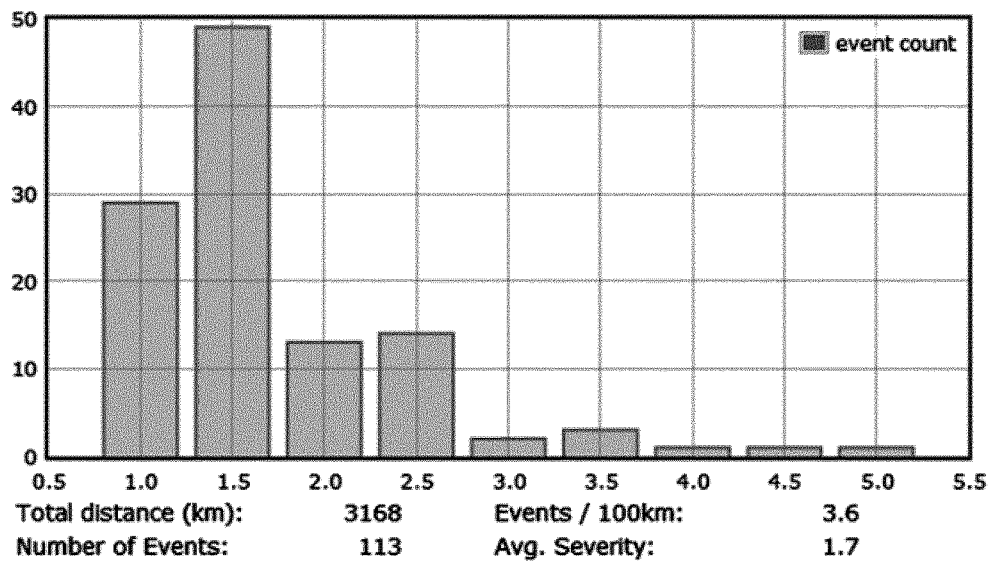
FIGS. 7A to 7D provide examples of histogrammed performance indicators.
Figure 7B:
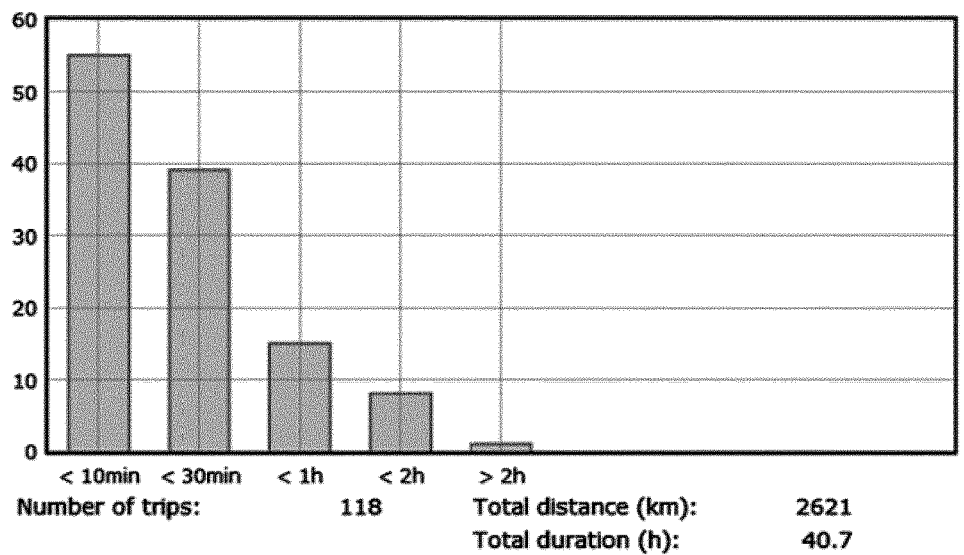
Figure 7C:
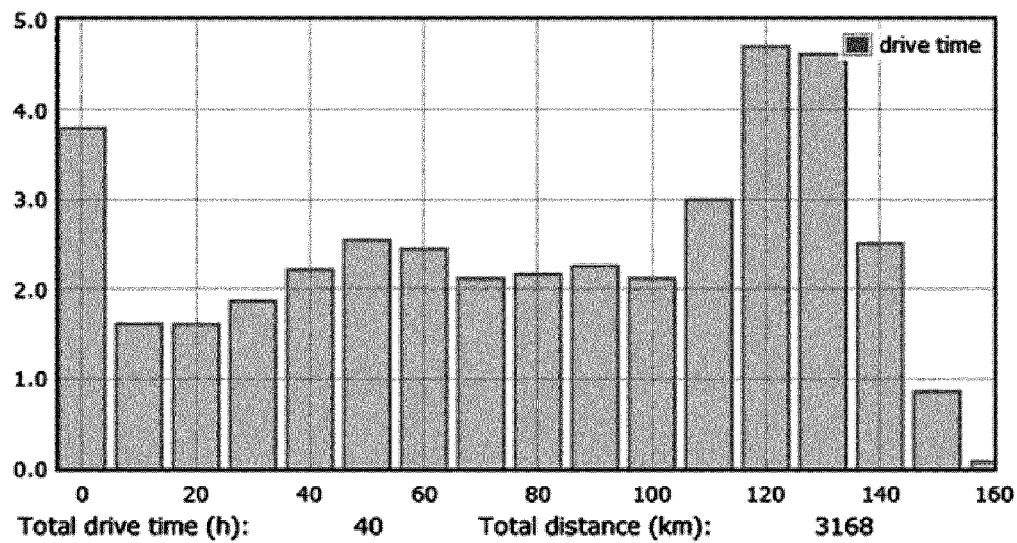
Figure 7D:
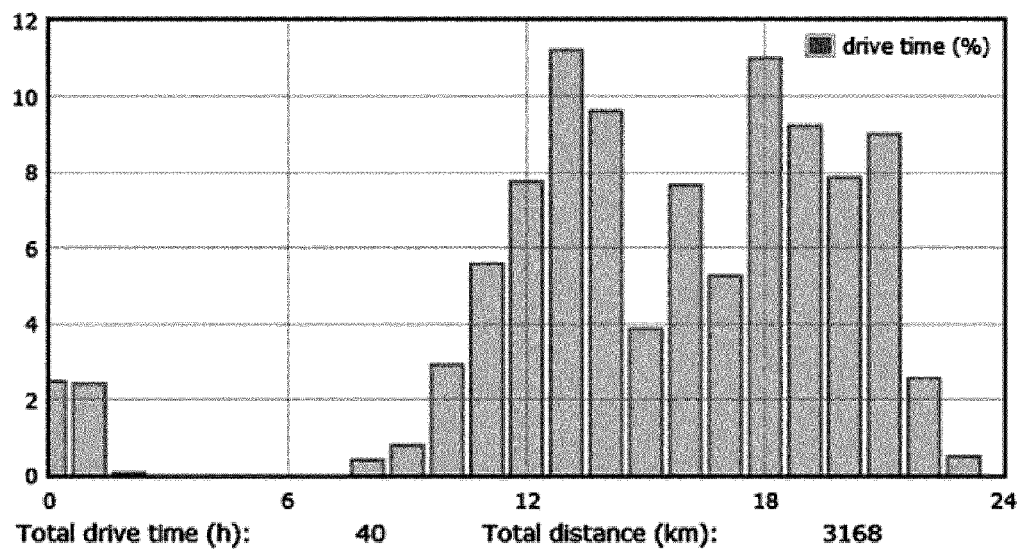

So as to enable the dongle 2 to collect and store OBD data in its memory 12 for extended periods of time between upload processes, e.g. up to at least 30 days, the dongle's microcontroller 10 aggregates the raw OBD data into risk profile data and logs the risk profile data on a daily basis. The raw profile data may comprise scalar performance indicators that are represented by a single value per day for OBD data such as mileage (based on the virtual odometer), driving time (calculated from total engine running time minus total idling time), idling time, number of trips, average trip duration, average trip distance and number of cold starts. The raw profile data may comprise histogram performance indicators that are represented by aggregated values to show the distribution of measured OBD data in different ranges, e.g. the time the engine was operated in different rpm ranges of 0-500 rpm, 501-1000 rpm, etc. These ranges are predefined by the microcontroller 10, so the dongle 2 only needs to store a fixed amount of data for each range. FIGS. 7A to 7D provide some examples of histogram performance indicators used to create the risk profile data that is stored in the dongle's memory 12. FIG. 7A shows a braking events distribution, FIG. 7B shows a trip duration distribution, FIG. 7C shows a driving time distribution by vehicle speed, and FIG. 7D shows a driving time distribution by time of day.

Figure 8A:
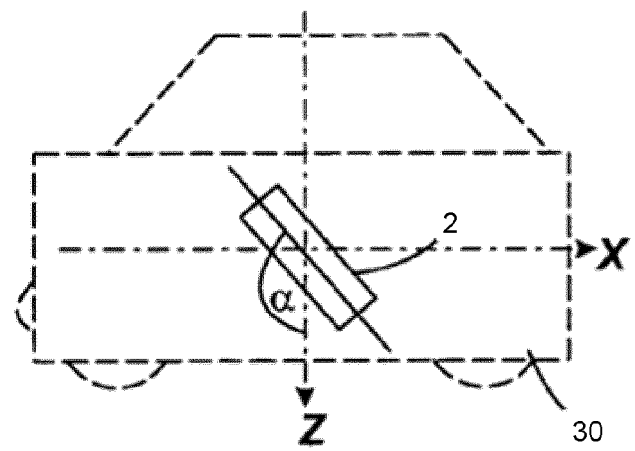
FIGS. 8A to 8C are schematic diagrams showing the orientation of a wireless communication device in a vehicle.
Figure 8B:
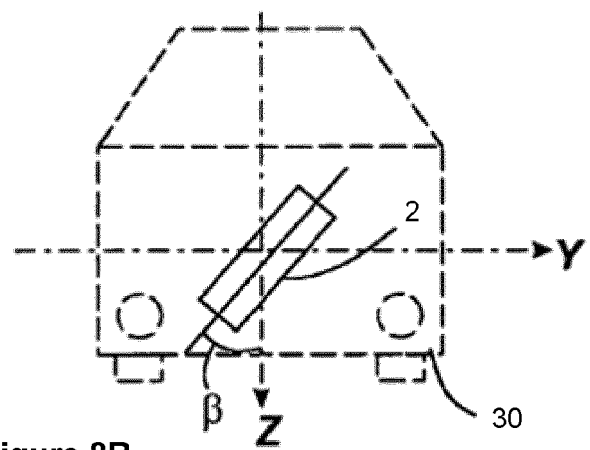
Figure 8C:
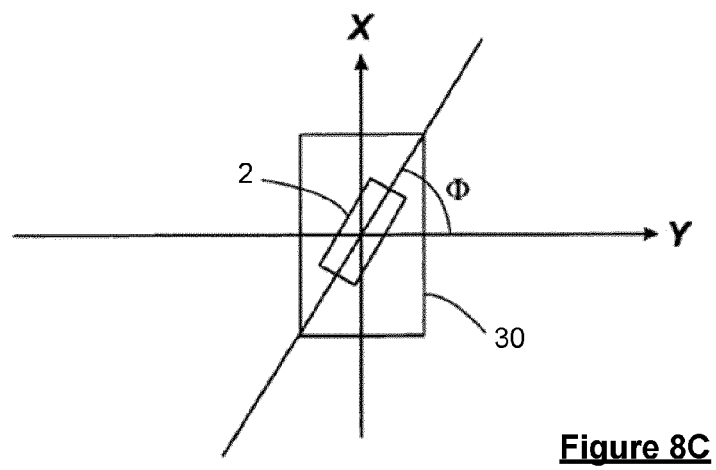

It will now be described how the dongle 2 is able to determine the orientation of the accelerometer 16 relative to a vehicle 30 without using GPS data. FIGS. 8A to 8C show how the vehicle system is defined as three-dimensional Euclidean space, where the x- and y-axes are orthogonal to the direction of gravity. FIG. 8A shows a side view of the vehicle 30, FIG. 8B shows a head-on view, and FIG. 8C shows a top view. The Earth's gravity vector is aligned with the z-axis, i.e. pointing in the direction of the vehicle top and bottom. The vehicle front and back are aligned along the x-axis and the vehicle sides are aligned along the y-axis. The arrow in FIG. 8A indicates the vehicle's forward direction of motion. The dongle 2 has no fixed installation requirements in the vehicle 30.

Firstly, the x- and y-rotation of the dongle 2 relative to the vehicle coordinate system is determined in vehicle stand still, e.g. as known from the OBD data, so as to avoid the measurement of dynamic acceleration parts. This is shown as angles $\alpha$ and $\beta$ relative to the gravity vector in FIGS. 8A and 8B (also known as "pitch" angle $\alpha$ and "roll" angle $\beta$). The angles $\alpha$ and $\beta$ relative to the earth's gravity are used to determine a "mean inclination vector". This vector is used to calculate a rotational matrix which is used during driving to rotate each sample vector measured by the accelerometer 16 to the vehicle coordinate system. Secondly, the z-rotation of the dongle 2 relative to the vehicle system is determined as an angle $\Phi$ seen in FIG. 8C (also known as the "yaw" angle). The mean inclination vector can be subtracted from each sample vector measured by the accelerometer 16 to leave only the dynamic acceleration parts, i.e. removing the acceleration part due to earth's gravity. The x- and y-components of the resulting vector point somewhere in the xy-plane of the vehicle 30. However, the z-component is not necessarily zero if the vehicle is not driving orthogonally to its centre of gravity, e.g. driving on a hill or cambered surface. If the z-component can be neglected then the three-dimensional vector can be transformed to a two-dimensional vector in the xy-plane.

To determine the angle Φ of the dongle 2 (and hence of the accelerometer 16) representing a z-rotation relative to the vehicle system, the direction of the two-dimensional vector in the xy-plane is calculated using OBD speed data. The processor 10 looks at the OBD speed data to identify situations where the vehicle speed is steadily increasing or decreasing, and where the direction of acceleration measured by the accelerometer 16 does not change. This indicates that the vehicle 30 is driving straight and accelerating or breaking, thus the measured vector is in line with the x-direction of the vehicle 30. For example, the processor 10 may determine when the OBD speed values are increasing or decreasing for a predetermined period of time, e.g. a minimum of three seconds. During this period the two-dimensional vectors in the xy-plane are also monitored, to see whether their magnitude stays greater than a predefined threshold and to see whether they point in a constant direction. Statistical filtering may be applied to make the method more reliable. For example, the mean direction and direction variance of the two-dimensional vectors may be calculated and the processor 10 may check whether the variance stays below a predefined threshold. If the predetermined conditions are met, then the mean direction is determined to match the heading angle during a vehicle acceleration or breaking situation and therefore match the x-direction of the vehicle 30. The angle difference Φ between the alignment of the dongle 2 and the vehicle coordinate system may be stored in the memory 12.

With knowledge of the installation position of the dongle 2 in the vehicle 30, each sample vector measured by the accelerometer 16 can be rotated to fit the coordinate system of the vehicle 30, i.e. the dongle 2 is able to self-calibrate without needing any GPS data. The processor 10 is then able to use data from the accelerometer 16 to categorise driving events into classes e.g. braking, acceleration, cornering (right curve), cornering (left curve). Events with a minimum duration of 500 ms may be detected and stored in the memory 12.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to the use of a smartphone (or other similar mobile telecommunications device) to transfer data to and from the OBD dongle and server, it will be appreciated that any suitable form of gateway (or Internet-enabled device) may be used to provide the necessary connection. For example, the OBD dongle may communicate wirelessly with a computing device, such as a portable computer, laptop, or other similar mobile device, which in turn communicates with the server using any suitable means, e.g. via the telecommunications network.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A wireless communication device for collecting vehicle on-board diagnostics (OBD) data, the device comprising:
   a connector for connecting the device to a vehicle OBD port to receive OBD data;
   a processor configured to aggregate the OBD data into risk profile data comprising at least one of: (i) one or more scalar indicators and (ii) one or more histogram indicators, wherein each scalar indicator represents a single average value for a particular category of OBD data in a given time period;
   a memory for storing the risk profile data; and
   a wireless transceiver for pairing with an external mobile telecommunications device to wirelessly transmit the risk profile data,
   wherein the wireless communication device is arranged to store the risk profile data in the memory until the wireless communication device is paired with a mobile telecommunications device and a data transmission instruction is received.

2. A device according to claim 1, wherein each histogram indicator represents the distribution of a particular category of OBD data in one or more given ranges.

3. A device according to claim 1, wherein the particular category of OBD data for a scalar indicator is chosen from one or more of: (i) distance travelled i.e. mileage; (ii) driving time; (iii) idling time; (iv) number of trips; (v) trip duration; (vi) trip distance; and (vii) number of cold starts.

4. A device according to claim 1, wherein the histogram indicator(s) further include at least one of: (i) number of acceleration events in a given force range; and (ii) number of cornering events in a given force range.

5. A device according to claim 1, wherein the wireless transceiver is a short-range transceiver using infrared or radio frequency communication.

6. A device according to claim 1, further comprising an accelerometer, wherein the accelerometer is arranged to identify one or more driving events.

7. A device according to claim 6, further comprising a processor arranged to process OBD data received from the vehicle OBD port and to determine an orientation of the accelerometer relative to the vehicle based on the OBD data.

8. A device according to claim 7, wherein the processor is configured to rotate an acceleration vector measured by the accelerometer to the coordinate system of the vehicle.

9. A device according to claim 7, wherein the processor is configured to determine that at least one OBD data satisfies at least one predetermined condition in a predetermined time period so as to indicate vehicle direction.

10. A device according to claim 6, wherein the processor is configured to determine an orientation of the accelerometer based on velocity data received from the vehicle OBD port.

11. A device according to claim 10, wherein the processor is configured to determine when the magnitude of an OBD speed vector is increasing or decreasing for longer than a predetermined time period.

12. A device according to claim 6, wherein the one or more driving events comprise at least one of: braking; acceleration; deceleration; cornering (right curve); and cornering (left curve).

13. A collection system for vehicle on-board diagnostics (OBD) data, the system comprising:
- a wireless communication device according to claim 1; and
- a mobile telecommunications device for pairing with the wireless communication device and uploading OBD data to an external server.

14. A system according to claim 13, further comprising:
- an external server that receives OBD data uploads from the mobile telecommunications device.

15. A system according to claim 13, wherein the mobile telecommunications device is arranged to communicate a data transmission instruction to the wireless communication device.

16. A system according to claim 13, wherein the mobile telecommunications device is arranged to prompt a user to instruct transmission of OBD data from the wireless communication device when it determines that no OBD data has been received for a certain period of time.

17. A method for aggregating vehicle on-board diagnostics (OBD) data collected by a wireless communication device, comprising:
- receiving OBD data from a vehicle OBD port;
- aggregating the OBD data into risk profile data comprising at least one of: (i) one or more scalar indicators and (ii) one or more histogram indicators, wherein each scalar indicator represents a single average value for a particular category of OBD data in a given time period;
- storing the risk profile data in a memory until the wireless communication device is paired with an external mobile telecommunication device and a data transmission instruction is received;
- pairing with the external mobile telecommunication device; and
- after receiving a data transmission instruction, wirelessly transmitting the risk profile data to the external mobile telecommunication device.

18. A method according to claim 17, wherein the wireless communication device comprises an accelerometer, the method further comprising:
- processing the OBD data to determine when the vehicle is accelerating or decelerating in a straight line; and
- comparing the direction of acceleration or deceleration with an acceleration vector measured by the accelerometer to determine the orientation of the accelerometer relative to the vehicle.

19. A non-transitory computer readable medium comprising instructions that, when executed by a processor of a wireless communication device, cause the device to operate according to the method of claim 17.

* * * * *